May 9, 1933.   W. E. GOLDSBOROUGH   1,908,289
DOUBLE ACTING ENGINE
Filed July 30, 1929

Inventor
WINDER E. GOLDSBOROUGH

By his Attorney
Edmund F. Borden

Patented May 9, 1933

1,908,289

UNITED STATES PATENT OFFICE

WINDER E. GOLDSBOROUGH, OF SOUTH NORWALK, CONNECTICUT, ASSIGNOR TO DOHERTY RESEARCH COMPANY, OF NEW YORK, N. Y., A CORPORATION OF DELAWARE

DOUBLE ACTING ENGINE

Application filed July 30, 1929. Serial No. 382,139.

This invention relates to internal combustion engines particularly of the double acting type and has for its principal object to provide a construction in which the combustion takes place with equal efficiency in both ends of the cylinder.

In conventional double acting engines the combustion in that end of the cylinder through which the piston rod slides is not as efficient as that occurring in the opposite end of the same cylinder due to the fact that the piston rod increases the surface area to which the burning gases are exposed and also due to the fact that the same acts as an obstruction in the combustion space which in the case of injection type engines prevents the proper diffusion of the injected fuel throughout the air charge.

It is an object of this invention to overcome the above mentioned difficulties.

To this end it is a feature of this invention to provide a construction in which the combustion upon the piston rod side of the double acting cylinder occurs in an enclosed combustion chamber which is in communication with a working space of the engine only through a restricted opening so that combustion does not occur in contact with the piston rod thereby improving the combustion and protecting the piston rod from the deleterious effects of the high temperatures of combustion.

It is a further object of this invention to provide in injection type engines a construction and a mode of operation which will secure the most efficient atomization of the injected fuel and the complete diffusion thereof throughout the combustion supporting air change.

To this end it is a feature of this invention to provide a construction in which the incoming air enters in a direction opposite to and simultaneous with the injection of the highly atomized liquid fuel.

It is a further object of this invention to provide, in injection type engines, for the complete gasification of the injected fuel prior to its contact with the combustion supporting air by passing the same through a body of hot products of combustion of a previous charge flowing in the opposite direction while simultaneously subjecting the injected fuel to the heat of radiation from closely adjacent highly heated refractory coated walls of the combustion chamber.

It is a further object of this invention to provide in engines of the type described a means for thoroughly scavenging the combustion chamber of the engine while simultaneously, if desired, also scavenging the working space of the engine cylinder.

These and further objects of the invention will be more particularly described in connection with the accompanying drawing in which.

Figure 1:
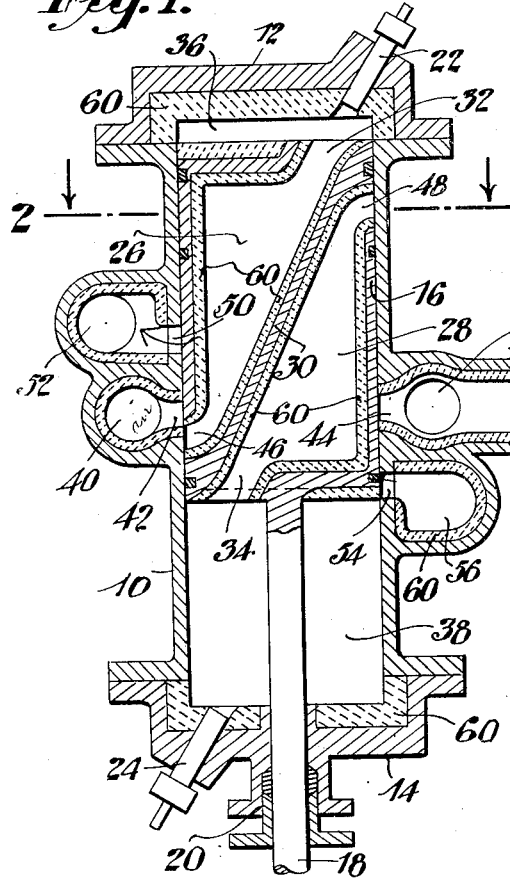
Fig. 1 is a longitudinal section through the cylinder and piston of an engine designed to function upon a cycle in which the combustion-supporting air while at high temperature and pressure is supplied to the working cylinder just before or simultaneously with the combustion period of the engine, parts being shown in side elevation.

Referring particularly to Fig. 1, reference numeral 10 indicates a cylinder of a double acting engine, the ends of which are closed by heads 12 and 14. A piston 16 is reciprocative in the cylinder 10 by means of a piston rod 18 integrally attached thereto. The rod 18 passes through the head 14, leakage therearound being prevented by a packing gland 20 as in usual double acting engine construction. Fuel injection nozzles 22 and 24, preferably of the solid injection type, are provided in the heads 12 and 14.

The piston 16 is of hollow construction and is divided into a pair of chambers 26 and 28 by means of a partition 30 extending diagonally therethrough. Chambers 26 and 28 communicate by means of restricted passages 32 and 34 with two working spaces 36 and 38 respectively, formed by each end of the cylinder 10. The restricted orifices 32 and 34 are so positioned as to be adjacent to and in line with the nozzles 22 and 24 during the injection periods of the engine.

At about the middle of the cylinder 10 and surrounding its circumference is an annular inlet channel 40 for the supply of highly compressed heated air to the engine in accordance with the cycle previously mentioned. The channel 40 opens by way of ports 42 and 44 into the cylinder 10 at diametrically opposite points in the circumference thereof. The port 42 is adapted to register with a port 46 in the side wall of the piston 16 when the same is passing through its upper dead center position thereby affording a means of communication between the annular channel 40 and combustion chamber 26 during this period in the cycle of the engine. The port 44 is adapted to register with a port 48 in the side wall of the piston 16 when the latter is passing through its lower dead center position thereby affording means of communication between the combustion chamber 28 and the annular air supply channel 40.

Immediately above the air supply port 42 is an exhaust port 50 adapted to be uncovered by the upper edge of the piston when the same is passing through its lower dead center position thereby affording communication between the working space 36 and an exhaust passage 52. A similar exhaust port 54 is provided immediately below the air inlet port 44 which is adapted to be uncovered by the lower edge of the piston 16 when the same is passing through its upper dead center position thereby affording a means of communication between the lower working space 38 and an exhaust passage 56.

The inner surfaces of the cylinder heads 12 and 14 as well as the two faces of the piston 16 and the walls of the two combustion chambers 26 and 28 are preferably provided with a substantial coating of non-conducting refractory material 60 in order to avoid material heat losses and to protect these metallic parts from the high temperatures at which the engine is designed to operate. Since in accordance with the cycle previously mentioned the incoming air is at a high temperature the inner surfaces of the supply channel 40 are also protected by a coating of refractory material as are likewise the interior walls of the exhaust passages 52 and 56.

In the operation of this construction when the parts are in the position shown and the piston 16 is moving upwardly the port 46 is about to register with the port 42. Upon further upward movement of the piston from the position shown these two ports come into registry and air from the supply channel 40 is admitted to the combustion space 26 driving the inert gases of a previous cycle which have remained therein into the small clearance left for mechanical purposes between the upper face of the piston 16 and the head 12. Simultaneously with the flow of the inert gaseous products of combustion through the passage 32 into the space 36 fuel is injected by way of nozzle 22 through the passage 32 in the opposite direction to the flow of gases and into and against the fresh highly heated compressed air supplied from channel 40. Since the fuel must traverse a considerable distance in which it is in contact with the hot products of combustion and it is simultaneously subjected to the heat of radiation from the hot refractory coating upon the wall of the partition 30 which lies parallel to and closely adjacent the stream of injected fuel the same becomes highly heated, largely gasified and therefore in the most desirable condition for complete combustion with the fresh air flowing in through the lower end of the combustion chamber 26. Air from the annular channel 40 continues to flow into the chamber 26 until the port 46 is moved out of registry with the port 42 on the downward stroke of the piston 16.

Combustion of the fuel in the fresh air charge in space 26 occurs closely upon the closure of communication between chamber 26 and channel 40 by the downward movement of the piston 16, the timing of the combustion being determined by the timing of the fuel injection through the nozzle 22, said injection being arranged to occur sufficiently ahead of the closure of said communication to permit the fuel to traverse the space between the atomizing orifice of the nozzle 22 and the combustion supporting air in chamber 26 against the flow of inert products of combustion through the passage 32. It will be understood that the orifice of the nozzle 22 may be designed to give the stream of injected fuel high penetrative power rather than fine atomization since the fuel is adequately prepared for combustion in the course of its passage into the fresh air charge in the chamber 26.

As the piston 16 continues to move downwardly the fuel is completely and rapidly consumed in the chamber 26, the products of combustion expanding through the passage 32 into the working space 36 and performing useful work against the piston. As the piston approaches its lower dead center the upper edge of the same uncovers the exhaust port 50 permitting the major portion of the products of combustion in the space 36 to pass out through the exhaust passage 52 to a recuperator not shown, the remainder of the gases in spaces 26 and 36 being at substantially atmospheric pressure. As the piston moves upwardly from its lower dead center position the products of combustion in these two spaces are again compressed until the port 46 registers with port 42 and a fresh supply of highly heated combustion supporting air displaces the gases into space 36 against the flow of injected fuel as the cycle repeats itself.

An exactly similar cycle takes place in the lower end 38 of the cylinder 10 which will be readily understood from the description of that occurring in the upper end of this cylinder. It will be observed that the passage 34 connecting the combustion space 28 with the working space 38 is directed away from the piston rod 18 thus preventing the hot products of combustion from impinging upon the piston rod and thereby losing a portion of their energy and deleteriously affecting the rod.

Figure 3:
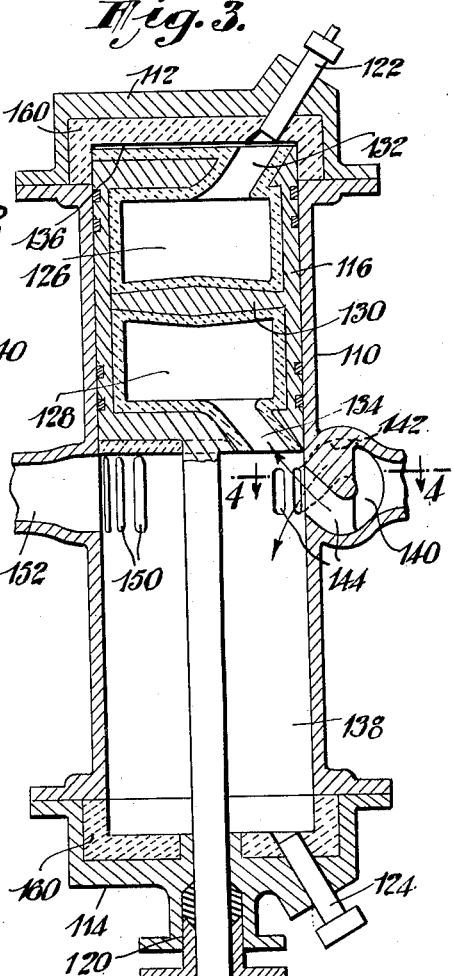
Fig. 3 is a longitudinal section through the cylinder and piston of an engine designed to function upon the Diesel or similar cycle, parts being shown in side elevation.
Figure 2:
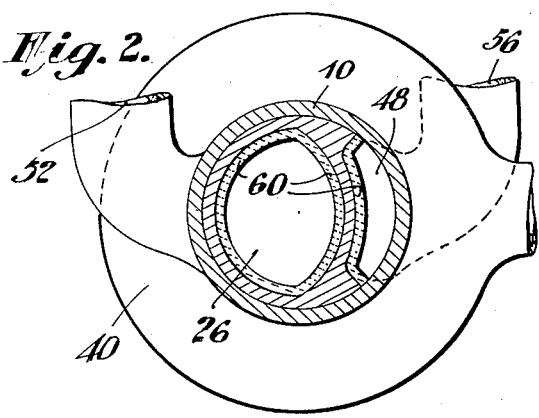
Fig. 2 is a section taken on the line 2—2 of Fig. 1.
Figure 4:
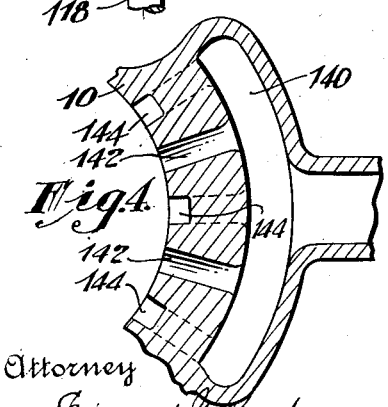
Fig. 4 is an enlarged detail of the scavenging air ports shown in Fig. 3.

Fig. 3 illustrates the application of the invention to a conventional type of solid injection engine. In this construction reference numerals 110, 112, 114 and 116 indicate a cylinder, cylinder heads and piston analogous to the similar parts in Fig. 1. A piston rod 118 is slidable through gland 120. Injection nozzles 122 and 124 similar to 22 and 24 are provided in heads 112 and 114 respectively. Chambers 126 and 128 are formed in the hollow piston 116 by means of a partition 130 extending in this case preferably traversely therethrough. Restricted passages 132 and 134 provide means of communication between combustion chambers 126 and 128 and combustion spaces 136 and 138 respectively of the engine. A scavenging air inlet passage 140 is provided in the side wall of the cylinder 110 at about the mid-point of its length. The scavenging air is adapted to enter the cylinder through ports 142 and 144 which ports are substantially oppositely directed. In the diametrically opposite side wall of the cylinder 110 exhaust ports 150 are provided which communicate with an exhaust passage 152. The interior walls of the engine are preferably protected by a coating of refractory material 160, as in the construction previously described.

Since there are no ports provided in this construction which are analogous to the ports 46 and 48 for the admission of combustion supporting air to the chambers 126 and 128 it is desirable to scavenge the chambers 126 and 128 through the passages 132 and 134 simultaneously with the scavenging of spaces 136 and 138 respectively. To this end therefore when the ports are in the position shown the space 138 being open to the exhaust 152 through ports 150, scavenging air flows downwardly through ports 142 in the direction indicated by the arrows thoroughly scavenging this space, while air also passes upwardly from ports 144 through the passage 134 in the direction of the arrows thereby scavenging the chamber 128.

While the scavenging process is being effected in the lower part of the cylinder 110, i. e. spaces 128 and 138, combustion is occurring in the combustion chamber 126 in the opposite end of the cylinder. As the piston moves downwardly from the position shown until the same is in its lower dead center position the products of combustion in the space 126 expand through passage 132 performing useful work. When the piston reaches its lower dead center position the upper space 136 is placed in communication with the exhaust passage 152 due to the uncovering of ports 150 by the upper edge of the piston 116. The upper space 136 and the combustion chamber 126 are now scavenged by air passing upwardly into the space 136 through ports 144 and downwardly through ports 142 into space 126. It will be seen that this embodiment of the invention likewise provides a construction in which the piston rod of a double acting engine is protected from the highly heated gases during the combustion period and provides for more even power due to the similarity of the conditions under which combustion takes place upon both sides of the piston.

While there has been herein described but two specific embodiments of the invention it will be obvious to those skilled in the art that various other modifications may be made in the details of construction without departing from the principles herein set forth.

What is claimed as new is:

1. In a double-acting internal combustion engine, a cylinder, a piston reciprocative therein, a piston rod extending from a face of said piston, a combustion chamber in said piston communicating with the cylinder through said face of said piston.

2. In a double-acting internal combustion engine, a cylinder, a piston reciprocative therein, a piston rod extending from a face of said piston, a combustion chamber in said piston having a passage communicating with the cylinder through said face of said piston, the said communicating passage being directed away from said piston rod.

3. In a double-acting internal combustion engine, a cylinder, a piston reciprocative therein, a piston rod attached to one end thereof, said piston being divided into two chambers, one opening into the piston rod side of said cylinder and the other into the opposite end of the said cylinder.

4. In combination, a piston, a piston rod attached thereto, a chamber in said piston having a restricted opening on the piston rod side thereof.

5. In combination, a piston, a piston rod attached thereto, a chamber in said piston having a restricted opening on the piston rod side thereof, said opening being directed away from said piston rod.

6. In an internal combustion engine, a cylinder, a piston having a combustion chamber therein communicating with said cylinder through a restricted passage, a passage to admit air to said combustion chamber when the piston is in about its upper dead center position, and means to inject fuel into said chamber.

7. In a double-acting internal combustion engine, a cylinder, a piston reciprocative therein, a partition extending through said piston dividing the same into two combustion chambers each having communication with an end of said cylinder through a restricted opening.

8. In a double-acting internal combustion engine, a cylinder, a piston reciprocative therein, a partition extending through said piston dividing the same into two combustion chambers each having communication with an end of said cylinder through a restricted opening, passages to alternately supply air to each of said chambers and separate means to supply fuel thereto.

9. In a double-acting internal combustion engine, a cylinder, a piston reciprocative therein, a partition extending through said piston dividing the same into two combustion chambers each having communication with an end of said cylinder through a restricted opening, and oppositely directed passages to alternately scavenge each of said chambers and the end of said cylinder with which it communicates.

10. In an internal combustion engine having a cylinder and a piston reciprocative therein, an exhaust port and interlaced bi-directional admission air ports, whereby interlaced streams of air are projected both downward and upward within the cylinder during the period of air admission.

11. In an internal combustion engine, a cylinder, a piston having a combustion chamber therein communicating with said cylinder through a restricted opening and passages arranged to scavenge said combustion chamber concurrently with the injection of fuel.

12. In the piston of an engine, a diagonal partition therethrough dividing the interior of said piston into two chambers, and passages to admit actuating fluid at one end of each of said chambers and expand it through the opposite end of each of said chambers.

13. The method of operating an internal combustion engine comprising compressing a portion of the products of combustion of a previous charge into dead spaces by an entering charge, injecting fuel into said entering charge and expanding the resulting products of combustion.

14. The method of operating an internal combustion engine comprising compressing a portion of the products of combustion of a previous charge into dead spaces by an entering charge, injecting fuel against the entering flow and expanding the resulting products of combustion.

In testimony whereof I affix my signature.

WINDER E. GOLDSBOROUGH.